March 16, 1965  E. Z. CHENETTE ETAL  3,173,676
MILLING MACHINE VISES AND THE LIKE AND AUXILIARY JAWS THEREFOR
Filed Oct. 25, 1962

INVENTORS
EDMOND Z. CHENETTE
LEO E. CHENETTE
BY
Clark & Ott
ATTORNEYS

United States Patent Office 3,173,676
Patented Mar. 16, 1965

3,173,676
MILLING MACHINE VISES AND THE LIKE AND AUXILIARY JAWS THEREFOR
Edmond Z. Chenette, Scribner Ave., Norwalk, Conn., and Leo E. Chenette, Clearwater, Fla.
Filed Oct. 25, 1962, Ser. No. 233,029
3 Claims. (Cl. 269—240)

This invention relates to vises for milling machines and the like and the invention has particular reference to auxiliary jaws therefor adapted for increasing the usefulness thereof.

The invention comprehends fixed and movable auxiliary jaws having pairs of jaw faces between which small as well as large articles may be held for milling and other cutting operations.

The jaws of the usual milling machine vise have limited relative movement with a maximum of approximately four inches when in open relation whereby articles of a maximum dimension in one direction of four inches may be held. The present invention overcomes the limitations and disadvantages of the usual milling machine vise by providing fixed and movable auxiliary jaws which are releasably secured in position upon the upper faces of the jaws of the vise and which have a plurality of pairs of oppositely disposed jaw faces between which articles may be held for machining operations. This provides means by which one of the pair of faces may have open movement from zero to a maximum of approximately four inches, while another of the pairs of jaw faces may have open movement from four inches to a maximum of eight inches and still another pair of faces may be provided having open movement from eight inches to approximately ten inches.

Still another object of the invention is to provide fixed and movable auxiliary jaws which may be conveniently affixed to and removed from the fixed and movable jaws of the usual vise.

The invention includes fixed and movable auxiliary jaws which are releasably secured upon the upper faces of the fixed and movable jaws of a vise and which are of angulated shape in section providing pairs of vertical jaw faces arranged with the faces of each pair in oppositely disposed relation, and with the jaws of the vise provided with shoulders against which the auxiliary jaws are positioned.

With the foregoing and other objects in view, reference is now made to the following specification and accompanying drawings in which the preferred embodiments of the invention are illustrated.

Figure 1:
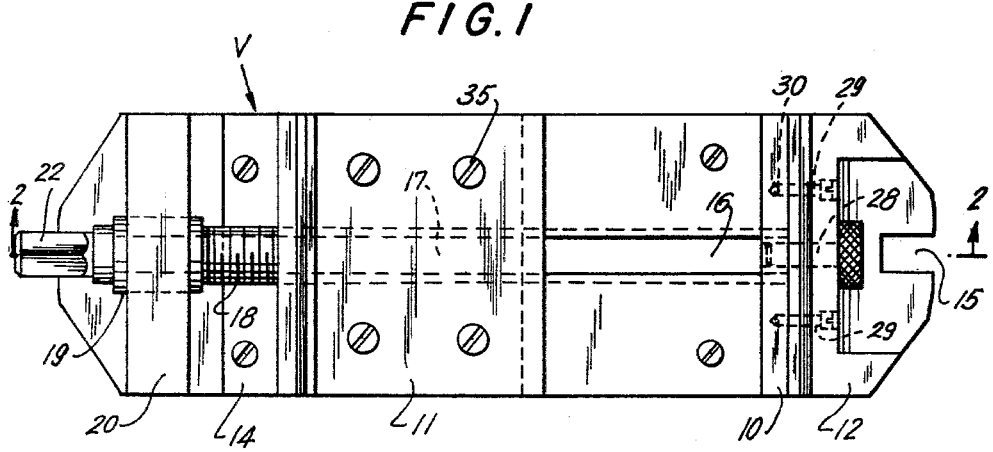
FIG. 1 is a plan view of a milling machine vise having auxiliary jaws constructed in accordance with the invention and with the jaws of the vise provided with means for securing the auxiliary jaws thereon.
Figure 2:
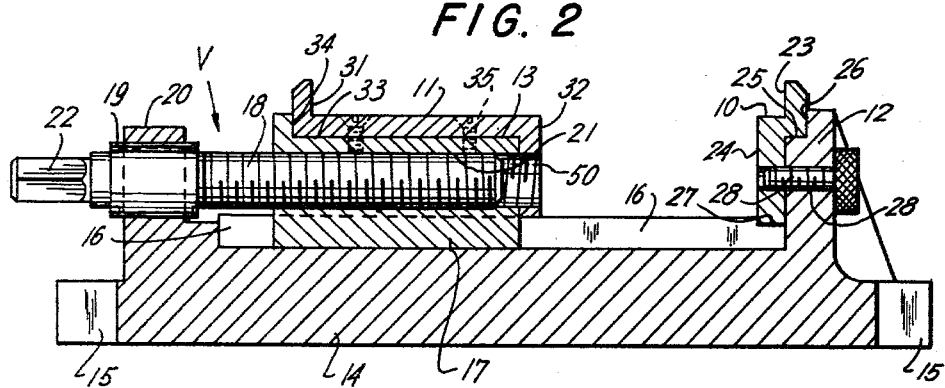
FIG. 2 is a longitudinal sectional view taken approximately on line 2—2 of FIG. 1.

Referring to the drawings and more particularly to the form of the invention illustrated in FIGS. 1 and 2 of the drawings, fixed and movable auxiliary jaws 10 and 11 are provided which are adapted to be releasably secured upon the fixed and movable jaws 12 and 13 of a vise V of the type used in conjunction with milling machines and the like. The vise V includes a base 14 having recesses 15 at the ends thereof for receiving bolts for attaching the vise to the bed of a milling machine and the like. The base is also provided with an undercut slot 16 extending longitudinally of the upper face thereof in which is slidably received a correspondingly shaped tongue 17 depending from the underside of the movable jaw 13 for guided movement of the movable jaw toward and away from the fixed jaw 12 by means of the turning of a screw 18 swivelly mounted in a sleeve 19 secured in the upstanding flange 20 with the inner end of the screw 18 threaddedly engaging the threaded opening 21 extending longitudinally of the movable jaw 13. The screw is adapted to be turned by a handle member (not shown) engaging the outer end 22 thereof.

The auxiliary jaw 10 is of angulated formation in longitudinal section providing jaw faces 23 and 24 which extend laterally the width of the base and with the jaw face 23 disposed in the upper portion of the jaw above and in stepped relation with the jaw face 24 in the lower portion of the jaw depending from the upper portion thereof. The fixed jaw 12 of the vise is laterally recessed as at 25 providing a shoulder 26 in which recess the upper portion of the auxiliary jaw 10 is positioned and disposed in engagement with the shoulder. The auxiliary jaw 10 abuts against the forward face of the fixed jaw 12 of the vise and snugly fits a recess 27 in the upper face of the base.

The auxiliary jaw 10 is releasably affixed to the fixed jaw 12 of the vise by a headed pin 28 engaging through aligned openings in said jaws and by means of screws 29 extending through the fixed jaw 12 with the inner ends thereof threaddedly engaging threaded openings 30 in the auxiliary jaw 10. The auxiliary jaw 10 is thus retained in the slot 27 and against the fixed vise jaw 12.

The auxiliary jaw 11 is also of angulated formation in longitudinal section providing jaw faces 31 and 32 which extend laterally the width of the base and with the jaw face 31 disposed above and in stepped relation with the jaw face 32. The movable jaw 13 of the vise is laterally recessed in the upper face thereof as at 33 providing a shoulder 34 in which recess the upper portion of the auxiliary jaw 11 is positioned and disposed in engagement with the shoulder 34 while the forward portion of the auxiliary jaw 11 abuts against the forward face of the vise jaw 13. A plurality of screws 35 releasably secure the auxiliary jaw in operative position on the jaw 13 of the vise.

It will be understood that an article may be held in position between the faces 24 and 32 of the fixed and movable jaws 10 and 11 and by turning the screw 18 the face 32 may be moved into close relation with the face 24 for holding relatively small articles, while the movable jaw 11 may be moved to its maximum spaced relation so as to accommodate articles of the maximum spacing in one direction. Articles of a size larger than the maximum spacing of the faces 24 and 32 may be held between the faces 23 and 31. Thus, the usual vise with the auxiliary jaws provides means by which relatively small as well as large articles may be held in position for milling and other operations.

Figure 3:
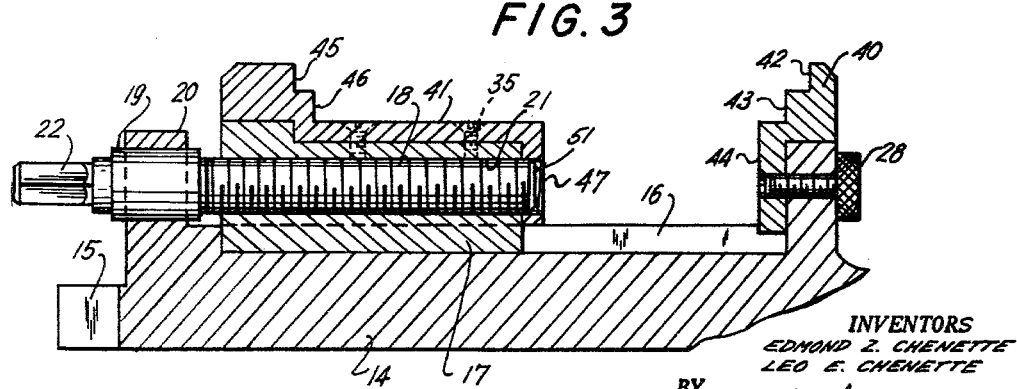
FIG. 3 is a similar view showing fixed and auxiliary jaws with a plurality of jaw faces.

Fixed and movable jaws 40 and 41 may be provided as shown in FIG. 3 of the drawings which are adapted to be releasably mounted on the fixed jaw 12 and auxiliary jaw 13 of the vise V as hereinbefore described in connection with the auxiliary jaws 10 and 11. The auxiliary jaws 40 and 41 are of angulated formation in section, the fixed jaw 40 providing step faces 42, 43 and 44 which are oppositely disposed in alignment respectively with the stepped jaw faces 45, 46 and 47 of the movable auxiliary jaw 41.

The jaw faces 43 and 46, and 44 and 47 correspond to the jaw faces 23 and 31, and 24 and 32 respectively of the form shown in FIGS. 1 and 2 of the drawings, while the jaw faces 42 and 45 provide means for holding a somewhat larger article in position for milling and other cutting operation than can be held in the previously described form.

The auxiliary jaws 11 and 41 are formed with threaded openings 50 and 51 disposed in alignment with the threaded opening 21 in the movable vise jaw 13 for receiving the screw 18 when the movable jaws are moved to wide open relation.

It is apparent from the foregoing that the auxiliary jaws provide means by which the usual vise has increased usefulness for holding small as well as relatively large articles for milling and other cutting operations.

While the preferred forms of the invention are shown and described herein, it is to be understood that the same are not so limited but shall cover and include any and all modifications thereof which fall within the purview of the invention.

What is claimed is:

1. A milling machine vise comprising a base, a fixed jaw located at one end of the base and having a top face and an upwardly extending face at one end thereof, a movable jaw having a top face and an upwardly extending face at one end thereof disposed in confronting relation with the upwardly extending face of the fixed jaw, means carried by said movable jaw and said base guidedly mounting said movable jaw for movement toward and away from said fixed jaw, and a screw engaging said base and said movable jaw for moving said movable jaw toward and away from said fixed jaw by turning said screw, auxiliary jaws including a fixed auxiliary jaw and a movable auxiliary jaw, said fixed auxiliary jaw being of angulated formation in section including a top portion and a portion depending therefrom, each of said portions having an upwardly extending jaw face arranged with the said faces disposed in spaced apart stepped relation, means mounting said fixed auxiliary jaw on the fixed jaw of the vise with the top and depending portions thereof in bearing engagement with the top and upwardly extending faces of the fixed jaw respectively of the vise, said movable auxiliary jaw being of angulated formation in section having a top portion and a portion depending therefrom, each of said portions having an upwardly extending jaw face arranged with said faces disposed in spaced apart stepped relation, means mounting said movable auxiliary jaw on the movable jaw of the vise with the top and depending portions thereof disposed in bearing engagement with the top and upwardly extending faces of said movable jaw respectively of the vise to dispose the faces of the fixed auxiliary jaw in oppositely disposed confronting relation with the faces respectively of the movable auxiliary jaw.

2. A milling machine vise as set forth in claim 1 in which the fixed and movable jaws of the vise have upstanding portions disposed against the top portions of the fixed and movable auxiliary jaws at the outer ends thereof respectively.

3. A milling machine vise as set forth in claim 2 in which the means mounting the auxiliary jaws on the fixed and movable jaws of the vise are removable, and in which the depending portion of the fixed auxiliary jaw extends into a recess in the upper face of the base of the vise.

References Cited by the Examiner
UNITED STATES PATENTS

| | | | |
|---|---|---|---|
| 1,890,114 | 12/32 | Fulton | 269—265 X |
| 2,490,843 | 12/49 | Sordi | 269—262 X |
| 2,770,156 | 11/56 | Brettraner | 269—268 X |

ROBERT C. RIORDON, *Primary Examiner.*